United States Patent [19]

Ware

[11] 4,302,819
[45] Nov. 24, 1981

[54] FAULT TOLERANT MONOLITHIC MULTIPLIER

[75] Inventor: Frederick A. Ware, Los Altos Hills, Calif.

[73] Assignee: Hewlett-Packard Company, Palo Alto, Calif.

[21] Appl. No.: 86,842

[22] Filed: Oct. 22, 1979

[51] Int. Cl.³ .......................... G06F 11/20; G06F 7/52
[52] U.S. Cl. ..................................... 364/737; 364/758
[58] Field of Search ........................ 364/737, 758, 786

[56] References Cited
U.S. PATENT DOCUMENTS 3,665,174  5/1972  Bouricius et al. .............. 364/737 X
3,900,724  8/1975  McIver et al. ..................... 364/758

OTHER PUBLICATIONS

Pradhan, "Fault-Tolerant Carry-Save Adders", *IEEE Trans. on Computers,* Dec. 1974, pp. 1320-1322.
Waser, "High-Speed Monolithic Multipliers for Real--Time Digital Signal Processing", *Computer,* Oct. 1978, pp. 19-29.

*Primary Examiner*—David H. Malzahn
*Attorney, Agent, or Firm*—David A. Boone

[57] ABSTRACT

A fault tolerant multiplier which utilizes a plurality of full adder rows has the ability to permanently deselect a row when a fault is detected in its initial testing. An extra row is provided to allow this deselection and transfer gates are provided between each row to shift the sum and carry logic on to the next row at the point of the deselected row and all rows therebeyond.

3 Claims, 5 Drawing Figures

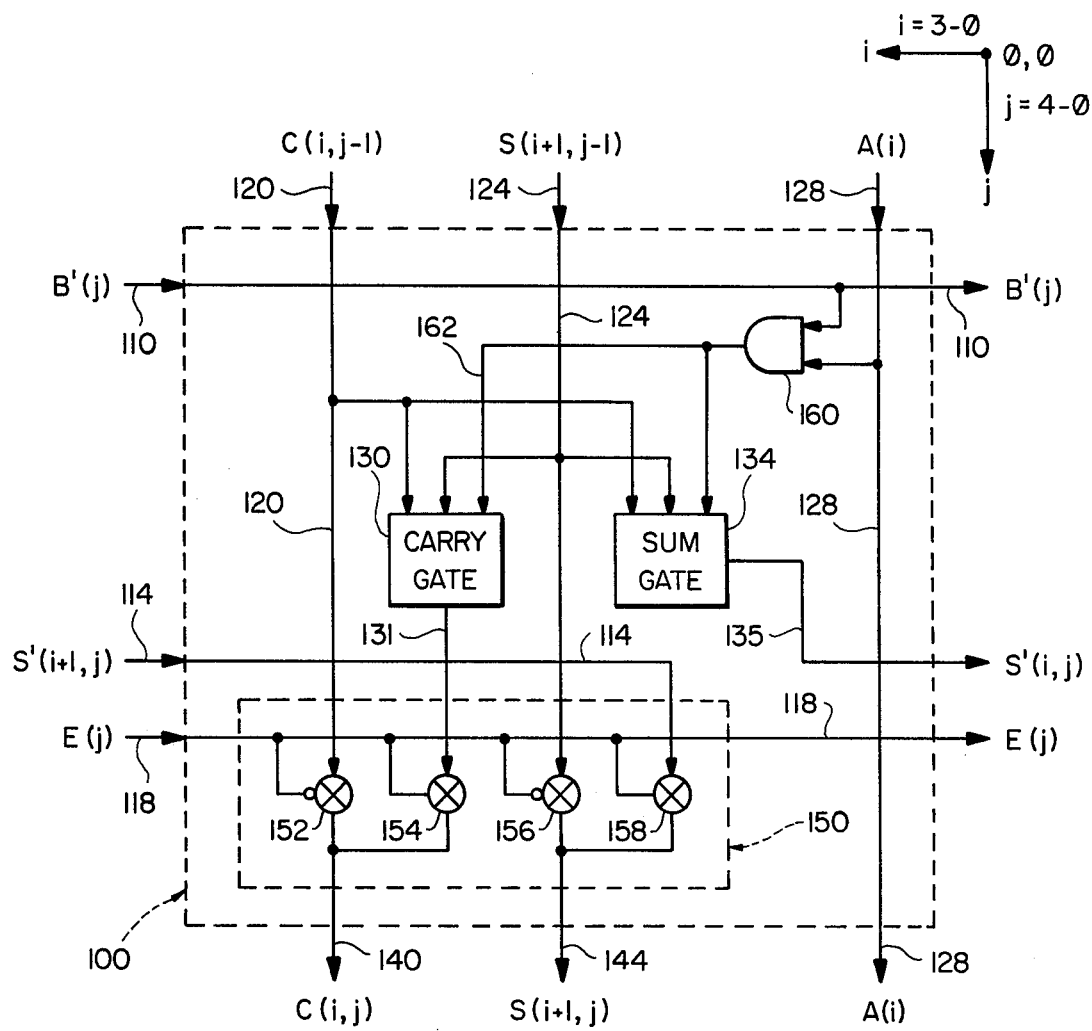
FIG_1
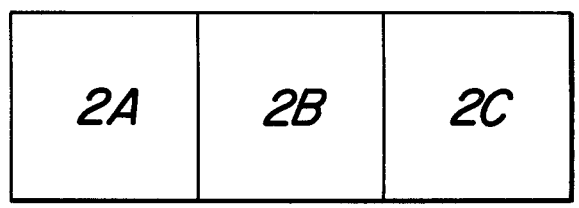
FIG_2

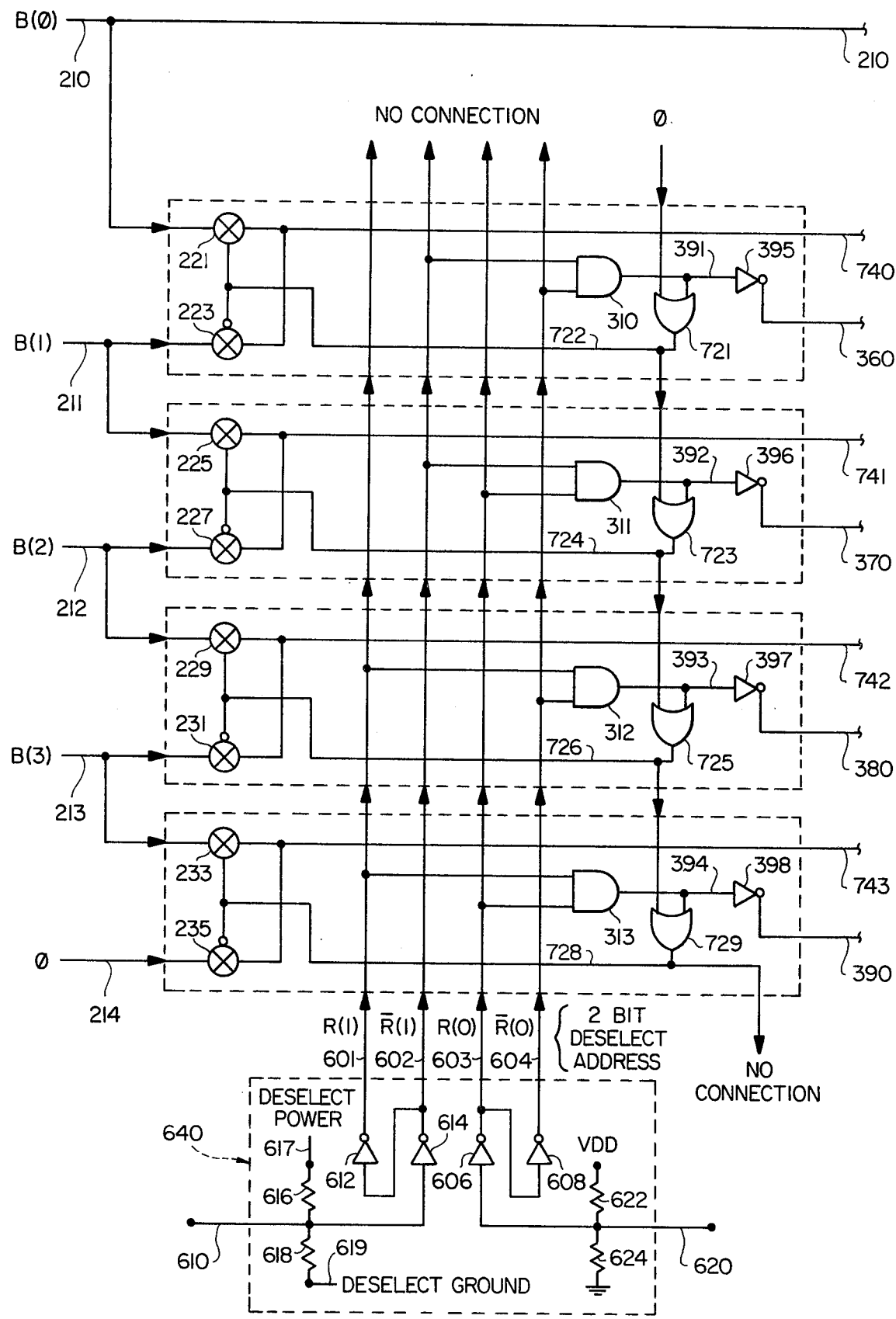
FIG_2A

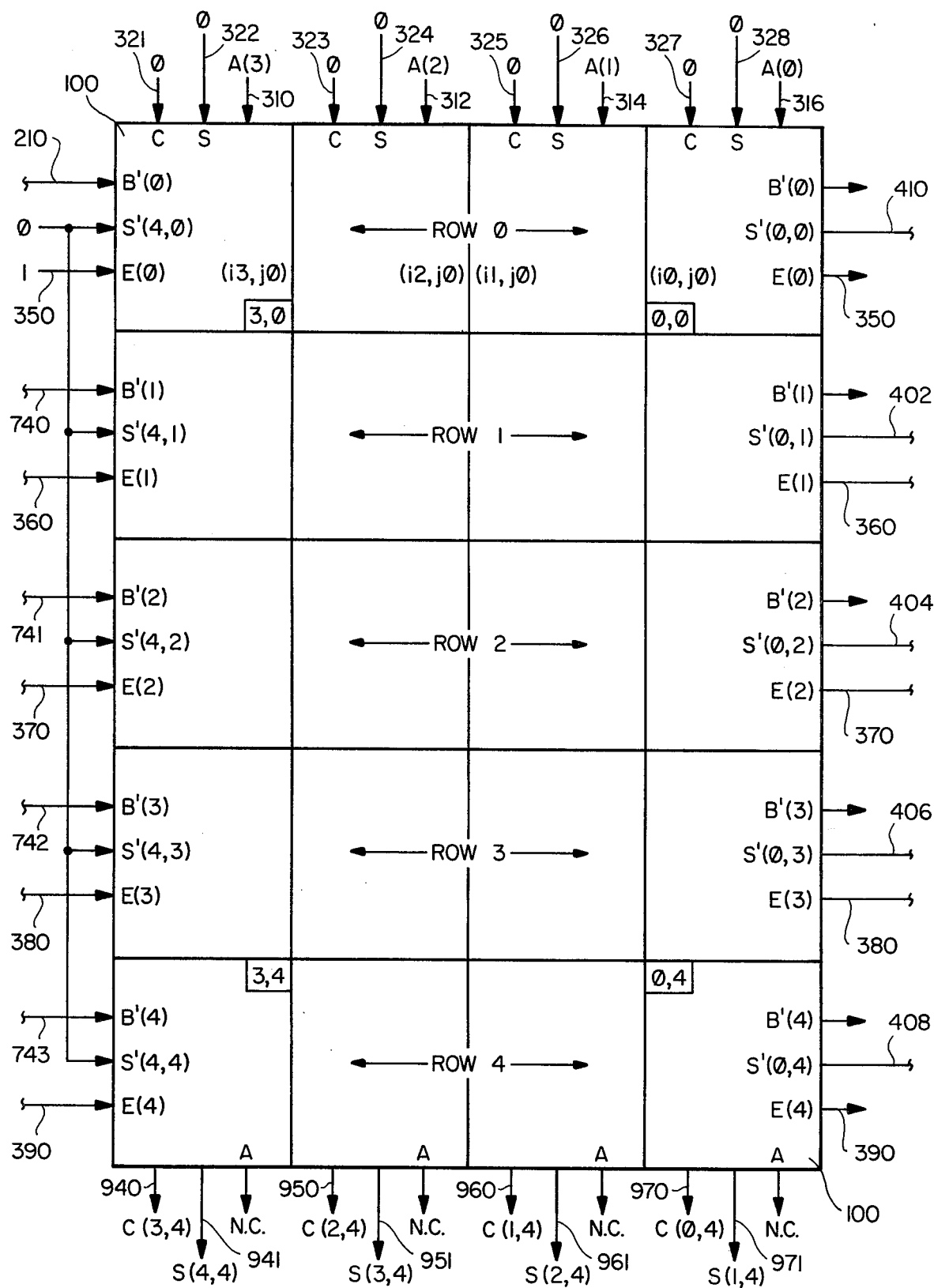
FIG_2B

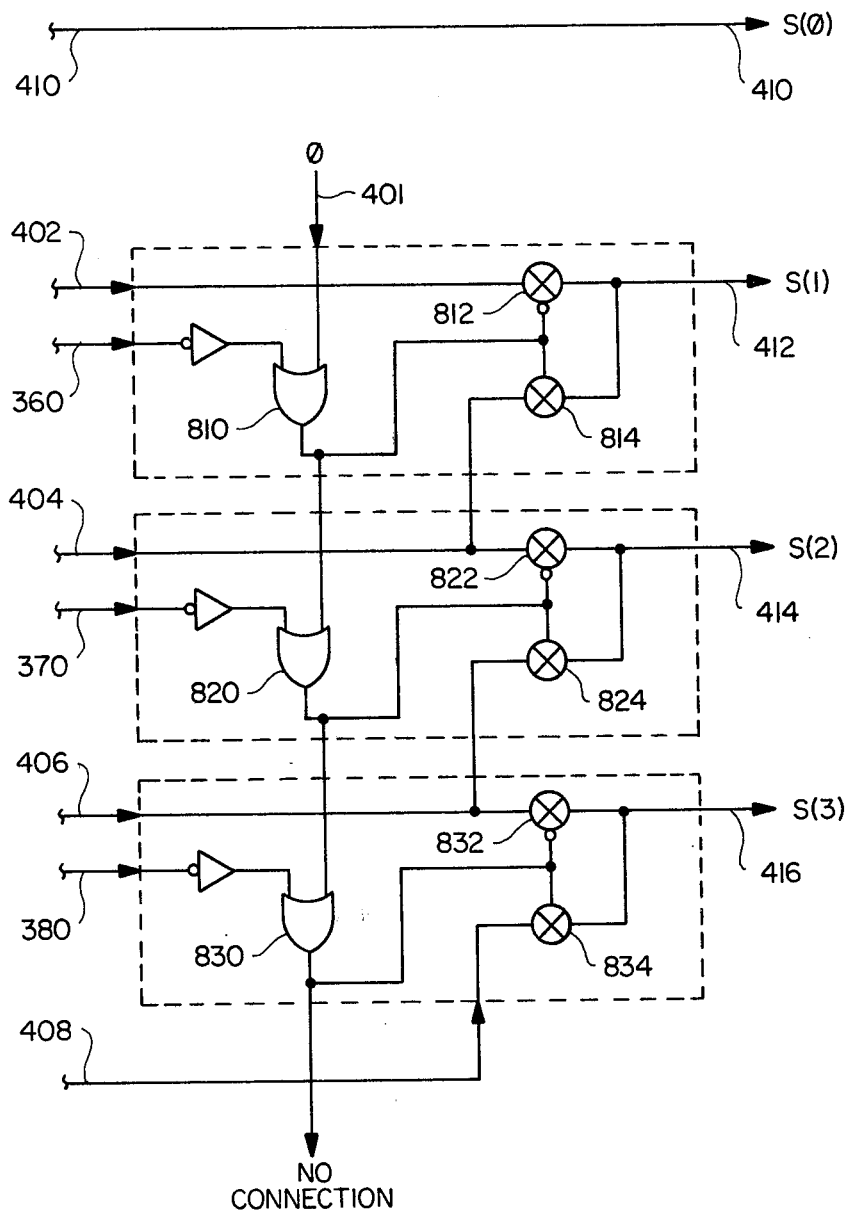
FIG_2C

FAULT TOLERANT MONOLITHIC MULTIPLIER

BACKGROUND AND SUMMARY OF THE INVENTION

Full adder arrays have been used to implement monolithic multipliers which give the product of two operands without the necessity of repetitively performing the operations of shifting and accumulating the intermediate results through an arithmetic logic unit.

However, the large adder arrays necessary to effect this type of multiplication (when placed on a single chip) increase the possibility that a single defect, originally in the substrate itself or arising through a processing anomaly, will render the entire circuit useless.

In accordance with the preferred embodiment of the present invention a fault tolerant monolithic multiplier comprises a full adder array having at least one more row than functionally necessary. Ancillary gating and selection circuitry is provided to allow any row other than the first row to be deselected and the carry and sum logic signals for the deselected row and each subsequent row to be gated to the next row in line. Not including the first row as deselectable greatly simplifies the selection in gating logic required if the array size is a power of two as illustrated.

BRIEF DESCRIPTION OF THE DRAWINGS

FIG. 1 is a schematic diagram of a full adder cell for use in accordance with the preferred embodiment FIG. 2 indicates the relationship of FIGS. 2A, 2B and 2C, which, taken together, are a schematic diagram of a four by four fault tolerant multiplier (with a five by four full adder array) in accordance with the preferred embodiment.

DESCRIPTION OF THE PREFERRED EMBODIMENT

Referring now to FIG. 1, there is shown a full adder cell 100 for use in accordance with the preferred embodiment. One bit of an A operand is received on a line 128 while one bit of a B' operand is received on a line 110. A gate 160 performs a logical AND operation and provides an output signal indicating the result of this operation on a line 162. The signal on line 162 is provided to a carry gate 130 and a sum gate 134. Also, a carry input signal C (i, j−1) is received on a line 120 from an adder cell in the row above cell 100. This signal on line 120 is also input to carry gate 130 and sum gate 134 but is also provided to transfer gate 152. A sum input signal S (i+1, j−1) is received on line 124 from the adder cell in the row above cell 100. This sum input signal on line 124 is input to carry gate 130, sum gate 134 and a transfer gate 156.

Multiplexer 150 comprises transfer gates 152, 154, 156 and 158. These transfer gates are enabled by an enable signal E (j) on a line 118. A high logic signal enables gates 154 and 158 while a low enable signal on line 118 indicates that the row is not enabled and therefore indicates that it has been deselected and hence the carry input signal on line 120 is passed through transfer gate 152 without modification to line 140 where it is received by the adder cell in the row below adder cell 100. Similarly, the sum input signal on line 24 is passed through transfer cell 156 to the adder cell below cell 100 via line 144 if the row containing adder cell 100 has not been enabled.

Otherwise, if the row is enabled by the signal on line 118 then carry gate 130 will combine the carry input signals on line 120, the sum input signal on line 124 and the operand signal on line 162 provided by gate 160 and will provide on line 131 a high or one logic signal on a line 131 if two or more of its input signals are also high, i.e. logic ones.

Sum gate 134 provides a logical one signal on line 135 if one or three of its input signals are in a high or logical one state. The input signals to sum gate 134 are the signal on line 162, the sum input signal on line 124 and the carry input signal on line 120.

Note that in the arrangement as shown the less significant bits of the A operand are gated to a cell to the right of cell 100 and the more significant bits of the A operand are gated to the cells to the left of cell 100. Similarly the less significant bits of the B' operand are gated to the cells above cell 100 and the more significant bits of the B' operand are gated to the rows containing the cells below cell 100.

Referring now to the schematic diagram of FIG. 2, there is shown a five row by four column adder array used to effect a four by four fault tolerant monolithic multiplier. The least significant bit of the B operand B (0) is received on line 210. Similarly B (1) is received on line 211; this signal B (2) is received on line 212 while the signal B (3) which is the signal representing the most significant bit of the B operand, is received on line 213. A low signal is received on line 214 as this row is the extra row provided which allows deselection.

The A operand least significant bit is represented by the signal A (0) and is received on a line 316. Signals A (1) and A (2) are received on lines 314 and 312 respectively while the most significant bit A (3) is received on the line 310. Note that zeros are input on lines 321, 322, 323, 324, 325, 326, 327 and 328 which are the sum and carry input signals to the first row, since there are no previous rows to provide these inputs. The result of the multiplication operation of the A and B operands is provided on lines 410, 412, 414 and 416 with line 416 providing the signal S (3) which represents the most significant bit while line 410 carries the signal S (0) which represents the least significant bit of the result. Note that line 410 is always provided from the first row of the full adder array. However, the signal on line 412 is provided from either the signal on line 402 or 404 while the signal on line 414 is provided in response to the signal on line 404 or 406 and the signal on line 416 is provided in response to the signal on line 406 or the signal on line 408. The selection of which signal to supply on lines 412, 414 and 416 is dependent upon whether a row has been deselected and if so which one has been deselected. A zero is provided on line 401 since it is given in the design of the preferred embodiment that row zero is not deselectable.

Enable signal on line 350 is always provided as a one since row zero is never deselected under the scheme used in the preferred embodiment. Deselection of one of the other rows (after detection that a fault exists in that row) and the manner in which that row should be deselected is accomplished as described below.

Lines 601, 602, 603 and 604 carries the signals R (1), $\overline{R}$ (1), R (0), $\overline{R}$(0) which form a two-bit deselect address which is decoded by gates 310, 311, 312 and 313. The decoded row being deselected by an enable signal generated on lines 391, 392, 393 or 394 which in turn through inverter gates 395, 396, 397 and 398 provide the enable signals on line 360, 370, 380 and 390 respectively.

Note that in the absence of any programming, row 4 will be automatically deselected and the multiplier will work with the four by four array above. When an error is found in a particular row, that row is permanently deselected. The address of the deselected row is held permanently by placing a ground potential on terminal 617 and the blowing or removal of one or more of the polysilicon fuses 616 or 622 by raising 610 or 620 to five volts. Similarly, a ground potential is placed on terminal 619 and fuses 618 or 624 may be removed by raising 610 or 620 to five volts. These polysilicon fuses are designed to blow if five volts is placed across them. After deselection, one fuse of every pair (i.e. 616/618 and 622/624) is blown, and 617 is supplied with five volts and 619 is supplied with ground.

Let us assume for example that row 2 was found to contain a fault as therefore to be deselected. Row 2 is deselected by placing high signal levels on lines 602 and 603. Thus causing gate 311 to produce a high logic signal on line 392. To provide the high logic signals on line 602 and 603, it is necessary for inverters 614 and 606 to receive low signal inputs. This permanent programming is accomplished by blowing the polysilicon fuses 616 and 622 to remove the voltage sources which flow through them. This blowing of polysilicon fuses 616 and 622 is done by placing a sufficiently negative potential on terminals 610 and 620 so that a five volt potential is exceeded across polysilicon fuses 616 and 622.

Once row two has been deselected, the high logic signal on line 392 causes OR gate 723 to provide a high potential on line 724 which causes transfer gate 227 to be disabled and gate 225 to be enabled. Note that transfer gate 225 thus gates the signal on 211 as the input to row 2. This would be the normal operation if row 1 had been deselected. Thus, row 2 would be receiving the $B_1$ input on line 211 and the input signal on line 212 would be shifted to row 3. However, in the example row 2 has been deselected not row 1 and row 1 also continues to receive the signal on 211. The signal on line 212, however, and all the internal carry and sum logic that normally would be transferred from row 1 to row 2 is gated instead to row 3. For example, the high output of OR gate 723 similarly generates high outputs from OR gate 725 and 729. This causes the shifting of the signal on 213 to row 4 as well as the shifting of the signal on line 212 to row 3 since transfer gates 229 and 233 are both enabled. Therefore, the operating inputs are shifted at the deselected row, in this case row 2, and each row thereafter. The internal carry and sum logic from the rows above is gated past the deselected row as was described with respect to FIG. 1. Note that similarly on the output side of the array, that is the product output on lines 410, 402, 404, 406, and 408 the resulting sum signals are restored to their original position as if the row had never been deselected. Again, addressing the specific example of row 2 having been deselected, the enable signal on line 370 will be low, thus causing the output of gate 820 to be high which will disable transfer gate 822 and enable gate 824. Thus, the output on line 406 from row 3 will be gated through transfer gate 824 onto line 414. In a similar fashion the output on line 408 is gated through transfer gate 834 to line 416.

It should be noted that the example of the preferred embodiment is only multiplying one four bit number by another. For larger operands such as 32 by 32 bit multiplication, the operation would be very similar in that a 32 by 33 array would be presented. However, the number of deselect lines and polysilicon fuses would increase to allow for the deselection of one in 32 rows rather than one in four as shown in the preferred embodiment.

The carry sum terms from row 4 on lines 940, 941, 950, 951, 960, 961, 970 and 971 are provided to carry propagate adders.

I claim:

1. Apparatus for multiplying first and second binary operands each having a nominal length of N bits, said first operand represented by first input signals and said second operand represented by second input signals, said apparatus comprising:
    an array of adder cells comprising means for providing carry and sum logic signals in response to said first and second binary operands, said array comprising a plurality of said adder cells logically arranged in N columns and at least N+ one rows, said array including product means for providing product output signals at the logical end of each row;
    selection logic means coupled to said array of adder cells for selecting N of said N+1 rows by deselecting one of said rows in response to a deselection signal; and
    input gating means coupled to said selection logic means for gating in successive order, said ones of said first input signals of said first operand corresponding to said deselected row and the logically succeeding rows to the rows following the deselected one of said N+1 rows.

2. The apparatus as in claim 1 and further comprising transfer gating means coupled to each of said adder cells and to said selection logic means for gating said carry and sum logic signals from the row logically above said deselected row to the row logically below said deselected row.

3. The apparatus as in claim 1 and further comprising output gating means coupled to said selection logic means for gating product output signals of the rows logically below said deselected row logically upward so that said product output signals of said rows are provided on the lines upon which that they would have been provided had the deselected row not been deselected.

* * * * *